United States Patent [19]

Takarada et al.

[11] Patent Number: 5,134,191
[45] Date of Patent: Jul. 28, 1992

[54] HARD COATING COMPOSITIONS AND PLASTIC OPTICAL ARTICLES

[75] Inventors: Mitsuhiro Takarada, Annaka; Kazuharu Sato, Gunma; Kenji Yamamoto; Shigeru Mori, both of Annaka, all of Japan

[73] Assignee: Shin-Etsu Chemical Co., Ltd., Tokyo, Japan

[21] Appl. No.: 478,522

[22] Filed: Feb. 12, 1990

[30] Foreign Application Priority Data

Feb. 17, 1989 [JP] Japan .................................. 1-37540

[51] Int. Cl.$^5$ .............................................. C08K 3/10
[52] U.S. Cl. .................................. 524/783; 524/780; 524/786; 524/859; 524/860; 106/287.14; 528/16; 528/19
[58] Field of Search ................... 528/19, 16; 524/780, 524/786, 783, 859, 860; 106/287.14

[56] References Cited

U.S. PATENT DOCUMENTS

| | | | |
|---|---|---|---|
| 4,049,861 | 9/1977 | Nozari | 528/19 |
| 4,101,513 | 7/1978 | Fox et al. | 528/19 |
| 4,567,133 | 1/1986 | Isbrandt et al. | 528/19 |

*Primary Examiner*—Melvyn I. Marquis
*Attorney, Agent, or Firm*—Birch, Stewart, Kolasch & Birch

[57] ABSTRACT

A hard coating composition comprising an epoxy group-containing organic silicon compound and inorganic submicron particles such as silica sol is curable with a minimal amount of an antimony compound as the curing catalyst. The composition is thus stable during shelf storage and can be cured to a plastic optical article as a mar resistant hard coating film.

8 Claims, No Drawings

HARD COATING COMPOSITIONS AND PLASTIC OPTICAL ARTICLES

This invention relates to hard coating compositions suitable for forming a coating layer having mar resistance, high hardness, and chemical resistance, that is, a hard coating film on plastic articles, typically optical articles such as plastic lens. It also relates to plastic optical articles having a hard coating film formed on a surface thereof.

BACKGROUND OF THE INVENTION

Plastic optical articles are generally characterized by light weight, ease of processing and impact resistance. In the prior art, various coatings were used on such plastic optical articles for the purpose of imparting mar resistance and solvent resistance thereto. One such coating is proposed in Japanese Patent Publication No. 2735/1982 as a composition comprising an epoxy group-containing silicon compound, colloidal silica, and aluminum chelate. This composition has a problem that the coating film can be colored upon curing at high temperatures of 110° C. or higher since the amount of aluminum chelate added is as large as 5 to 10% by weight based on the resin solids. In addition boiling immersion causes the coating film to lower its hardness and sometimes peel away from the substrate.

Another coating composition is disclosed in Japanese Patent Publication No. 9266/1987 as comprising an epoxy group-containing silicon compound, colloidal silica, and ammonium perchlorate. This coating liquid is unstable and prone to a color change since the amount of ammonium perchlorate added as the curing catalyst is as large as 1 to 2% by weight based on the resin solids.

Japanese Patent Application Kokai Nos. 30361/1978 and 46502/1985 disclose the use of perchloric acid and magnesium perchlorate as the curing catalyst for similar coating compositions. The strong acidity of these catalysts causes the coating liquids to show a substantial change with the lapse of time. The silanol resulting from hydrolysis of an epoxy group-containing silicon compound can undergo polycondensation in the presence of these acidic catalysts to soften the cured coating.

SUMMARY OF THE INVENTION

Therefore, an object of the present invention is to provide a hard coating composition which requires only a minimum amount of curing catalyst, has improved curing properties and shelf stability, and can form a hard coating film having high hardness, mar resistance, solvent resistance, and improved adherence without coloring upon curing. Another object of the present invention is to provide a plastic optical article having a hard coating film formed on a surface thereof.

The inventors have found that when a hard coating composition comprising (A) an epoxy group containing silicon compound of the formula:

$$R^1R^2_a Si(OR^3)_{3-a} \tag{1}$$

wherein $R^1$ is an organic group having 2 to 8 carbon atoms and containing an epoxy group, $R^2$ is selected from the class consisting of alkyl groups having 1 to 6 carbon atoms, alkenyl groups having 2 to 6 carbon atoms, halo-alkyl groups having 1 to 6 carbon atoms, and aryl groups having 6 to 10 carbon atoms, $R^3$ is selected from the class consisting of hydrogen, alkyl groups having 1 to 4 carbon atoms, alkoxyalkyl groups having 2 to 8 carbon atoms in which the alkoxy moiety has 1 to 4 carbon atoms, and acyl groups, and letter a is equal to 0, 1 or 2, or a partial hydrolysate thereof, and (B) inorganic submicron particles such as silica sol, alumina sol, and titania sol, is blended with a curing catalyst in the form of (C) an antimony compound of the formula:

$$M(SbX_6)_b \tag{2}$$

wherein M is a positively chargeable atom or ammonium group, X is a halogen atom, and letter b is the valence of M, curing of the epoxy group-containing silicon compound or a partial hydrolysate thereof can be significantly promoted with a minimal amount of the curing catalyst, which ensures that the coating composition is shelf stable and undergoes no coloring upon curing. The curing time and temperature can be further reduced by blending a curing co-catalyst in the form of (D) an aluminum compound of the formula:

$$AlY_3 \tag{3}$$

wherein Y is selected from the class consisting of a halogen atom, a hydroxyl group, an alkoxy group having 1 to 4 carbon atoms, an acyloxy group, a benzoyloxy group, and a perchlorate group, along with the antimony compound defined above. The resulting coating film has high hardness, mar resistance, and solvent resistance, that is, improved properties as hard coatings. In addition, the coating film obtained by applying the composition to a plastic lens is readily dyed with disperse dyes.

The hard coating composition having blended therein a mixture of sodium hexafluoroantimonate ($NaSbF_6$) as the antimony compound and aluminum chloride as the aluminum compound can cure in a shorter time at a lower temperature, thus avoid coloring upon curing, and be readily dyed with dispersed dyes after applied on plastic lenses.

According to the present invention, there is provided a hard coating composition comprising in admixture, (A) an epoxy group-containing silicon compound of formula (1) or a partial hydrolysate thereof, (B) inorganic submicron particles, (C) an antimony compound of formula (2), and optionally, (D) an aluminum compound of formula (3).

The present invention also provides a plastic optical article having a hard coating film formed on a surface thereof from a hard coating composition as defined above.

DETAILED DESCRIPTION OF THE INVENTION

Component (A) constructing the hard coating composition of the invention is a component contributing to film formation and adsorption of organic dyes. It is an epoxy group-containing silicon compound of the formula:

$$R^1R^2_a Si(OR^3)_{3-a} \tag{1}$$

wherein $R^1$ is an organic group having 2 to 8 carbon atoms and containing an epoxy group, R2 is selected from the class consisting of alkyl groups having 1 to 6 carbon atoms, alkenyl groups having 2 to 6 carbon atoms, halo-alkyl groups having 1 to 6 carbon atoms, and aryl groups having 6 to 10 carbon atoms, $R^3$ is selected from the class consisting of hydrogen, alkyl groups having 1 to 4 carbon atoms, alkoxy-alkyl groups having 2 to 8 carbon atoms in which the alkoxy moiety has 1 to 4 carbon atoms, and acyl groups, and letter a is equal to 0, 1 or 2, or a partial hydrolysate thereof.

Examples of the substituent represented by $R^1$ in formula (1) include glycidoxyalkyl groups having 1 to 4 carbon atoms, such as glycidoxymethyl and glycidoxypropyl, and epoxycyclohexylethyl. Examples of the substituent represented by $R^2$ include methyl, ethyl, propyl, 3-chloropropyl, 3,3,3-trifluoropropyl, vinyl, allyl, and phenyl groups. Examples of the substituent represented by $R^3$ include a hydrogen atom, methyl, ethyl, propyl, butyl, methoxymethyl, methoxyethyl, ethoxyethyl, acetyl, and propionyl groups.

Illustrative, non-limiting examples of the epoxy group-containing silicon compound of formula (1) include:

3-glycidoxypropyltrimethoxysilane,
3-glycidoxypropyltriethoxysilane,
3-glycidoxypropyltris(methoxyethoxy)silane,
3-glycidoxypropylmethyldimethoxysilane,
3-glycidoxypropylmethyldiethoxysilane,
2-(3',4'-epoxycyclohexyl)ethyltrimethoxysilane,
2-(3',4'-epoxycyclohexyl)ethyltriethoxysilane,
3-glycidoxypropylphenyldiethoxysilane, etc.

The epoxy group-containing silicon compounds may be used alone or in admixture of two or more.

The epoxy group containing silicon compound may be used as such although it may be previously hydrolyzed into a partial hydrolysate which is more preferred as component (A).

Component (A) as described above is generally dissolved in an organic solvent to form a coating composition. Examples of the suitable organic solvent include alcohols, ketones, esters, Cellosolves, and aromatic solvents.

The hard coating composition of the invention may contain an optional component in addition to component (A). The optional component may include trialkoxysilanes such as methyltrialkoxysilanes, vinyltrialkoxysilanes, phenyltrialkoxysilanes, and 3-methacryloxypropyltrialkoxysilanes; dialkoxysilanes such as dimethyldialkoxysilanes, vinylmethyldialkoxysilanes, phenylmethyldialkoxysilanes, diphenyldialkoxysilanes, and 3-methacryloxypropylmethyldialkoxysilanes; tetraalkoxysilanes such as methyl silicate, ethyl silicate, propyl silicate, and butyl silicate; polysilicates, and the like. The trialkoxysilanes may be blended in amounts of 0 to 100 parts by weight per 100 parts by weight of component (A) because compositions containing more than 100 parts of triakoxysilane do not firmly adhere to a substrate or readily cure with the curing catalyst. The dialkoxysilanes may be blended in amounts of 0 to 50 parts by weight per 100 parts by weight of component (A) because compositions containing more than 50 parts of diakoxysilane cure into softer films. The tetraalkoxysilanes or polysilicates may be blended in amounts of 0 to 50 parts by weight per 100 parts by weight of component (A) because compositions containing more than 50 parts of tetraalkoxysilane or polysilicate cure into films which are too brittle and prone to cracking.

Component (B) constructing the hard coating composition of the invention is a submicron particulate inorganic material which contributes to the hardness of the resulting coating film. The submicron particulate inorganic material is preferably selected from silica sol, antimony oxide sol, alumina sol, titania sol, and a mixture of two or more of them. The particles preferably have a particle size of from about 1 to about 200 m$\mu$, more preferably from about 5 to about 100 m$\mu$. Inorganic particles of smaller than 1 m$\mu$ in size would be less effective in increasing the surface hardness of the coating film whereas particles of larger than 200 m$\mu$ would detract from the clarity of the coating film.

For the inorganic submicron particles, commercially available acidic, neutral or basic solutions, more particularly colloidal solutions having inorganic submicron particles dispersed in water or organic solvents may be used. The solvents used herein are methanol, ethanol, isopropanol, isobutanol, diacetone alcohol, methyl Cellosolve, ethyl Cellosolve, and dimethylformamide. Examples of the inorganic submicron particles include Snowtex O, Snowtex C, Snowtex N, Methanol Silica Sol, Alumina Sol 520, Titanium Oxide Sol NTS-10R, DMF Sol, and Sun Colloid (all manufactured by Nissan Chemical Industry K. K.), Alumina Clear Sol (manufactured by Kawaken Fine Chemical K. K.), and Cataloid S (manufactured by Shokubai Kasei K. K.). Further, these commercially available acidic colloidal inorganic submicron particles may be neutralized with basic substances such as ammonia, amines and metal hydroxides to form neutral or basic colloids which are useful as the inorganic submicron particles used herein.

The amount of component (B) blended preferably ranges from 5 to 200 parts by weight, more preferably from 20 to 100 parts by weight per 100 parts by weight of component (A), provided that component (B) is calculated as inorganic submicron particle solids. Less than 5 parts by weight of component (B) is less desirable in forming a fully hard coating whereas more than 200 parts by weight of component (B) is likely to form a brittle coating having a poor covering power.

Component (C) is a curing catalyst for curing a mixture of components (A) and (B). According to the present invention, an antimony compound of the formula:

$$M(SbX_6)_b \qquad (2)$$

wherein M is a positively chargeable atom or ammonium group, X is a halogen atom, and letter b is the valence of M is used for the stability of the coating composition as well as the hardness, anti-yellowing, and curing properties of the resulting hard coating film. For example, M is hydrogen, lithium, sodium, potassium, magnesium, calcium, aluminum, or ammonium, and X is a halogen atom such as fluorine, chlorine, bromine, and iodine.

Examples of the antimony compound of formula (2) include lithium hexafluoroantimonate, sodium hexafluoroantimonate, potassium hexafluoroantimonate, ammonium hexafluoroantimonate, magnesium hexafluoroantimonate, aluminum hexafluoroantimonate, lithium hexachloroantimonate, and sodium hexachloroantimonate, alone or a mixture of two or more of them. Lithium hexafluoroantimonate, sodium hexafluoroantimonate, potassium hexafluoroantimonate, ammonium hexafluoroantimonate, magnesium hexafluoroantimonate, and aluminum hexafluoroantimonate are preferred among others.

The amount of component (C) or antimony compound added is an effective amount to cure the coating composition. The effective amount preferably ranges from 0.1 to 10 parts by weight, more preferably from 0.2 to 5 parts by weight per 100 parts by weight of component (A), which is less than one-half of the necessary amount of aluminum acetylacetonate used in conventional compositions. Less than 0.1 part by weight of antimony compound would be too small to promote the curing of a coating composition whereas the presence of more than 10 parts by weight of antimony compound would render the composition less stable.

In the practice of the invention, (D) an aluminum compound of the formula:

$$AlY_3 \quad (3)$$

wherein Y is selected from the class consisting of a halogen atom, a hydroxyl group, an alkoxy group having 1 to 4 carbon atoms, an acyloxy group, a benzoyloxy group, and a perchlorate group is preferably added along with antimony compound (C) insofar as the coating composition does not lose stability. The aluminum compound (D) acts as a co-catalyst for antimony compound (C), reducing the curing time and/or temperature of the coating composition.

Examples of the aluminum compound of formula (3) include aluminum chloride, aluminum hydroxychloride, aluminum ethoxide, aluminum propoxide, aluminum isopropoxide, aluminum butoxide, aluminum isobutoxide, aluminum acetate, aluminum propionate, aluminum benzoate, aluminum acetylacetonate, aluminum salicylate, aluminum lactate, and aluminum perchlorate.

The amount of component (D) or aluminum compound added is an effective amount to further promote curing of the coating composition. The effective amount preferably ranges from 0 to 5 parts, more preferably from 0.01 to 5 parts, most preferably from 0.05 to 3 parts by weight per 100 parts by weight of component (A). The presence of more than 5 parts by weight of aluminum compound would render the composition less stable.

Among components (C) and (D) mentioned above, it is recommended to use a mixture of NaSbF6 and aluminum chloride because it is effective in reducing the curing time and/or temperature and in improving the dyeability of the coating composition.

Any of various well-known additives may be added to the hard coating composition of the invention for the purposes of increasing the adhesion of the composition to substrates such as plastics and improving the weatherability, applicability, and glare protection of the composition insofar as the objects of the invention are properly attained. Examples of the useful additives which can be blended in the hard coating composition include epoxy resins, for example, polyolefinic epoxy resins, cyclohexene oxide, polyglycidyl esters, polycondensates of epichlorohydrin and bisphenol-A, and copolymers of glycidyl methacrylate and an acrylic compound; and UV absorbers such as benzophenones, benzotriazoles, and phenols. The epoxy resins may be blended in amounts of 0 to 30 parts per 100 parts by weight of component (A) because more than 30 parts by weight of epoxy resin will detract from weatherability. The UV absorbers may be blended in amounts of 0 to 20 parts per 100 parts by weight of component (A) because more than 20 parts by weight of UV absorber will lower hardness. Additionally, various surface-active agents may be blended in the composition for the purpose of improving the applicability thereof, for example, block and graft copolymers of dimethylsiloxane and polyether, and fluoride surface-active agents. The surface-active agents may be blended in amounts of 0 to 10 parts per 100 parts by weight of component (A) because more than 10 parts by weight of surface-active agent will detract from adherence to a substrate.

The hard coating composition of the invention may be prepared by mixing components (A) and (B) and an optional additive or additives, and then adding component (C) and optionally, component (D) to the mixture. Particularly when it is desired to use a partial hydrolysate of an epoxy group-containing silicon compound as component (A), the composition is prepared by first adding pure water or an acidic aqueous solution of hydrochloric acid or acetic acid to component (A) in admixture with an optional additive or additives for hydrolysis, and then adding components (B) and (C) and optionally, component (D) to the partial hydrolysate. If component (B) is added in the form of an acidic or basic solution, it is also possible to utilize the acidic or basic material available along with component (B) for the hydrolysis of component (A).

The hard coating composition of the invention may be based on a solvent, for example, lower alcohols such as methanol, ethanol, isopropanol, butanol, isobutanol, and diacetone, alcohol, and (lower) Cellosolves such as methyl Cellosolves, ethyl Cellosolves, Cellosolve acetate, and butyl Cellosolve. Also useful are mixtures of these solvents with other ester, ketone, amide, and aromatic solvents. The esters include ethyl acetate, (iso)-propyl acetate, and (iso)butyl acetate, the ketones include acetone, methyl ethyl ketone, methyl isobutyl ketone, and cyclohexanone, and the aromatic solvents include benzene, toluene, xylene, and ethylbenzene.

The pH of the hard coating composition of the invention is not particularly limited. Since both components (C) and (D) are acidic, the composition is preferably adjusted to pH 2.0 to 6.0 with the use of basic component (B).

The hard coating composition of the invention may be advantageously applied to various plastic materials as well as other substrates. The plastic materials to which the composition is applicable are not particularly limited. Better results are obtained when it is applied to polymethyl methacrylate, polycarbonate, polystyrene, polyesters, polyurethane, polythiourethane, and diethylene glycol bisallylcarbonate (trade name: CR-39), to name a few. The hard coating composition of the invention may be applied to a plastic material substrate, typically plastic optical article and heat treated into a protective coating film having a high hardness. It may be applied by any desired conventional techniques including brush coating, roll coating, spray coating, flow coating, dipping, and spin coating. The curing conditions will vary with the amount of curing catalyst blended and other factors. Usually, a cured coating film can be obtained by heating the coating to a temperature below the softening point of the plastic substrate, typically 80° to 150° C. for about ½ to about 10 hours.

The cured coating film resulting from the composition of the invention may be dyed with disperse dyes. For a particular disperse dye, dyeing conditions including the concentration, temperature, and time may be determined without undue experimentation. In general, the coating film is dyed by immersing in a dye bath containing about 0.1 to 1% by weight of a dye in water at about 80° to 100° C. for about 5 to 15 minutes.

EXAMPLE

Examples of the present invention are given below by way of illustration and not by way of limitation. All parts and percents are by weight unless otherwise stated.

EXAMPLES 1-6 AND COMPARATIVE EXAMPLES 1-6

Into a flask were admitted 100 grams of 3-glycidoxypropyltrimethoxysilane, 125 grams of 3-glycidoxypropylmethyldiethoxysilane, and 80 grams of isobutyl alcohol. With stirring under ice cooling, 38 grams of 0.05N dilute hydrochloric acid water was added dropwise over 30 minutes. After 300 grams of Methanol Silica Sol (a methanol dispersion at pH 8 having 30% by weight of non-volatile values, manufactured by Nissan Chemical Industry K. K.) was added to the mixture, the mixture was aged for 16 hours at 20°-25° C. Then 50 grams of ethanol and 70 grams of ethyl Cellosolve were added to the mixture, obtaining a coating liquid base.

The curing catalysts shown in Tables 1 and 2 each were added to 100 parts by weight of the coating liquid base. The resulting coating liquid was applied to an alkali-treated plastic lens of CR-39 by dipping and then cured at 100° C. or 120° C. for 60 minutes.

For comparison purposes, coating liquids were prepared by the same procedure as above except that ammonium perchlorate (Comparative Example 1) and aluminum acetylacetonate (Comparative Examples 2-4) were used as the curing catalyst. They were applied and cured to plastic lenses by the same procedure as above.

EXAMPLES 7-8 AND COMPARATIVE EXAMPLES 7-8

Coating compositions were prepared by substantially the same procedure as in Example 1 except that a mixture of 100 grams of a methanol solution of antimony oxide sol (pH 7, non-volatile values 30% by weight) and 300 grams of a dimethylformamide solution of colloidal silica (pH 8, non-volatile values 20% by weight) was used instead of 300 grams of Methanol Silica Sol. The curing catalysts used are shown in Table 2.

The hard coating films obtained were examined by the following methods.

Mar Resistance

The coating was rubbed 10 strokes with #0000 steel wool under a load of 500 grams and visually examined for mars.

Adhesion

A scribed adhesion test was carried out according to JIS K-5400, item 6.15. The coating was scribed with a knife to form a grid of 11 horizontal cuts and 11 vertical cuts all spaced 1 mm. An adhesive tape (manufactured by Nichiban K. K.) was applied and stripped to and from the scribed area. The number of remaining sections was counted.

Solvent Resistance

The coating was lightly wiped 100 times with acetone-impregnated absorbent cotton and visually examined for clarity.

Coloring

The cured coating was visually examined for color.

Dyeability

The CR-39 lens having the coating applied thereon was immersed for 5 minutes in an aqueous solution containing 0.2% by weight of disperse dye Brown D (manufactured by Seiko K. K.) at 87° C. The light transmittance of the lens was measured.

Aced Dyeability

The coating composition was stored for one month at 20° C. and then applied and cured to a CR-39 lens. The coating was examined for dyeability by the same test as above.

The results are shown in Tables 1 and 2.

TABLE 1

| | Curing catalyst | | Curing | | | | | |
|---|---|---|---|---|---|---|---|---|
| | Type | Amount (pbw) | temp. (°C.) | Mar resist. | Adhesion | Solvent resist. | Coloring | Dyeability (%) |
| E1 | NaSbF$_6$ | 1.0 | 120 | OK | 100/100 | OK | OK | 68 |
| E2 | NaSbF$_6$ AlCl$_3$ | 0.4 0.2 | 120 | OK | 100/100 | OK | OK | 72 |
| E3 | NaSbF$_6$ AlCl$_3$ | 0.5 0.2 | 100 | OK | 100/100 | OK | OK | 60 |
| E4 | NaSbF$_6$ Al(ClO$_4$)$_3$ | 0.5 | 100 | OK | 100/100 | OK | OK | 65 |
| CE1 | NH$_4$ClO$_4$ | 0.3 | 120 | OK | 100/100 | OK | slightly yellowed | 88 |
| CE2 | AAA* | 0.5 | 120 | mars | 100/100 | OK | OK | 52 |
| CE3 | AAA* | 2.0 | 120 | OK | 100/100 | OK | yellowed | 85 |
| CE4 | AAA* | 2.0 | 100 | mars | 100/100 | slightly whitened | OK | 40 |

*AAA: aluminum acetylacetonate

TABLE 2

| | Curing catalyst | | Curing | | | | | Dyeability (%) | |
|---|---|---|---|---|---|---|---|---|---|
| | Type | Amount (pbw) | temp. (°C.) | Mar resist. | Adhesion | Solvent resist. | Coloring | Initial | Aged |
| E5 | NaSbF$_6$ AlCl$_3$.6H$_2$O | 0.5 3.0 | 120 | OK | 100/100 | OK | OK | 72 | 67 |
| E6 | NaSbF$_6$ AlCl$_3$.6H$_2$O | 1.0 5.0 | 100 | OK | 100/100 | OK | OK | 68 | 63 |
| E7 | NaSbF$_6$ | 0.5 | 120 | OK | 100/100 | OK | OK | 80 | 75 |

TABLE 2-continued

| | Curing catalyst | | Curing temp. (°C.) | Mar resist. | Adhesion | Solvent resist. | Coloring | Dyeability (%) | |
|---|---|---|---|---|---|---|---|---|---|
| | Type | Amount (pbw) | | | | | | Initial | Aged |
| E8 | AlCl$_3$.6H$_2$O<br>NaSbF$_6$ | 3.0<br>0.5 | 100 | OK | 100/100 | OK | OK | 76 | 70 |
| CE5 | AlCl$_3$.6H$_2$O<br>NH$_4$ClO$_4$ | 5.0<br>0.3 | 120 | OK | 100/100 | OK | slightly yellowed | 88 | 68 |
| CE6 | AAA* | 0.5 | 120 | mars | 100/100 | OK | OK | 52 | 51 |
| CE7 | AAA* | 5.0 | 120 | OK | 100/100 | OK | yellowed | 90 | 40 |
| CE8 | AAA* | 5.0 | 100 | a few mars | 100/100 | slightly whitened | OK | 48 | 40 |

*AAA: aluminum acetylacetonate

As is evident from Tables 1 and 2, the hard coating compositions having an antimony compound of formula (2) as the curing catalyst can be cured with a smaller amount of curing catalyst into a hard coating film having improved mar resistance, solvent resistance, adhesion, and dyeability as compared with those prior art compositions using conventional curing catalysts like aluminum acetonate. Further, discoloration and variation with time are suppressed by using NaSbF$_6$ in combination with AlCl$_3$.6H$_2$O.

There has been described a hard coating composition which contains a minimum amount of curing catalyst sufficient to cure the composition and is thus shelf stable. The composition is cured into a hard coating film having high hardness, mar resistance, and solvent resistance. The film firmly bonds to the underlying material and undergoes no yellowing.

Although some preferred embodiments have been described, many modifications and variations may be made thereto in the light of the above teachings. It is therefore to be understood that within the scope of the appended claims, the invention may be practiced otherwise than as specifically described.

We claim:

1. A hard coating composition comprising in admixture,
   (A) an epoxy group-coating silicon compound of the formula:

$$R^1R^2_aSi(OR^3)_{3-a} \tag{1}$$

wherein
   $R^1$ is an organic group having 2 to 8 carbon atoms and containing an epoxy group,
   $R^2$ is selected form the class consisting of alkyl groups having 1 to 6 carbon atoms, alkenyl groups having 2 to 6 carbon atoms, halo-alkyl groups having 1 to 6 carbon atoms, and aryl groups having 6 to 10 carbon atoms,
   $R^3$ is selected form the class consisting of hydrogen, alkyl groups having 1 to 4 carbon atoms, alkoxyalkyl groups having 2 to 8 carbon atoms in which the alkoxy moiety has 1 to 4 carbon atoms, and acyl groups, and
   letter a is equal to 0, 1 or 2,
   or a partial hydrolysate thereof,
   (B) inorganic submicron particles selected form the group consisting of silica sol, antimonyoxide sol, aluminum sol, titania sol, and mixtures thereof, and
   (C) an antimony compound of the formula:

$$M(SbX_6)_b \tag{2}$$

wherein
   M is selected from the group consisting of hydrogen, lithium, sodium, potassium, magnesium, calcium, aluminum, and ammonium,
   X is a halogen atom, and
   letter b is the valence of M.

2. The composition according to claim 1 which further comprises
   (D) an aluminum compound of the formula:

$$AlY_3 \tag{3}$$

wherein Y is selected from the class consisting of a halogen atom, a hydroxyl group, an alkoxy group having 1 to 4 carbon atoms, an acyloxy group, a benzoyloxy group, and a perchlorate group.

3. The composition according to claim 2 wherein component (C) is NaSbF$_6$ and component (D) is aluminum chloride.

4. The composition according to claim 1, wherein the composition comprises 100 parts by weight of component (A), 5 to 200 parts by weight of component (B), and 0.1 to 10 parts by weight of component (C).

5. The composition according to claim 2 wherein the composition comprises 100 parts by weight of component (A), 5 to 200 parts by weight of component (B), 0.1 to 10 parts by weight of component (C), and up to 5 parts by weight of component (D).

6. The composition according to claim 5, wherein the composition contains 0.01 to 5 parts by weight of component (D) per 100 parts by weight of component (A).

7. The composition according to claim 2, wherein the composition contains 0.01 to 5 parts by weight of component (D) per 100 parts by weight of component (A).

8. The composition according to claim 1, wherein said composition contains two or more epoxy group-containing silicon compounds represented by formula I.

* * * * *